Aug. 15, 1939.    D. D. GOLDBERG    2,169,526
VALVE
Filed Feb. 9, 1938

INVENTOR.
David D. Goldberg.
BY Walter C. Ross.
ATTORNEY.

Patented Aug. 15, 1939

2,169,526

UNITED STATES PATENT OFFICE 2,169,526

VALVE

David D. Goldberg, Springfield, Mass., assignor to Chapman Valve Manufacturing Company, Indian Orchard, Mass., a corporation of Massachusetts Application February 9, 1938, Serial No. 189,622

1 Claim. (Cl. 251—113)

This invention relates to improvements in valves and has for its object the provision in a valve of the cone plug type which is characterized by a new and novel arrangement of seats.

In valves of the type commonly called cone valve, a tapering plug member is provided with a passageway and mounted in a body or casing for axial and reciprocating movements. In moving the plug between open and closed positions the plug is first moved axially relative to the casing to unseat it, then rotated to either its closed or open position and moved axially again for reseating in the casing. It is desirable and necessary that the plug be seated when in closed position, that is when its passageway is out of register with the ports in the casing, as well as when in open position with its passageway in register with the ports of the casing.

To provide means for proper seating, seat members of circular form have been provided which are located around the ports of the casing and other rings are provided on the plug around the ends of the passageway to cooperate with the body seats when the plug is in open position. Other rings on adjacent sides of the plug are provided for cooperating with the port rings when the plug is in closed position all of which makes it possible, as is desirable, to seat the plug in either its open or closed position.

According to this invention a new and novel arrangement of seats is provided which among other purposes facilitates economy in manufacture and efficiency in operation and the invention is characterized by seats which are adapted for engagement when the plug is in either its closed or open position.

Various and numerous objects and advantages of the invention will be hereinafter more fully referred to in connection with the accompanying description of the present preferred form of the invention.

Figure 1:
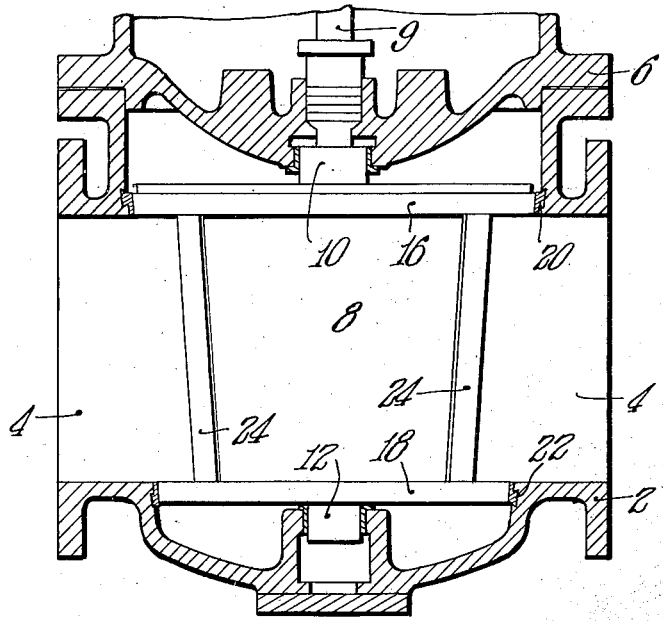
Fig. 1 is a longitudinal sectional elevational view through a valve apparatus embodying the novel features of the invention.
Figure 2:
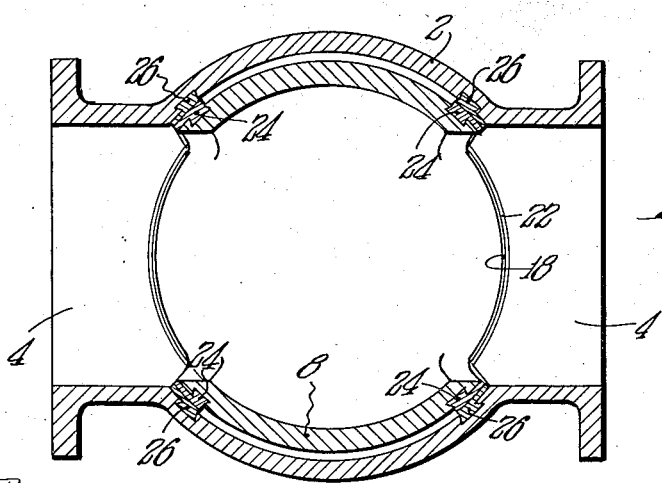
Fig. 2 is a plan sectional view through the valve shown in Fig. 1.

Referring now to the drawing more in detail the invention will be fully described, it being understood that the description is for purposes of disclosure and that many and various changes may be made without departing from the spirit and scope of the invention in its broad aspects.

A casing or body is represented by 2 which has ports 4 and a lever for a plug, as shown. A cap 6 is secured to the casing by any suitable means. A tapering plug 8 in the plug bore of the casing is mounted for rotation and reciprocation between open and closed positions and between seated and non-seated positions by some suitable means such as journal parts 10 and 12, as shown.

A spindle 9 is fixed to the plug 8 which may be rotated and reciprocated for operating the said plug as aforesaid. Any desired operating means may be employed and since the same forms no part of the present invention is therefore not illustrated.

The plug 8 has a passageway 14 therethrough for registering with the ports of the casing when in open position as shown. When the plug is rotated from the open position shown to its closed position the passageway is of course out of register with the casing ports so that said ports are blanked off by the plug. The plug is shown in seated position but as stated it is movable axially to non-seated position prior to rotation and is then moved axially for reseating.

The seating members of the invention may take various forms all within the scope of the invention. In the form of the invention shown the various seat members are secured in or to the plug and casing and may be of any suitable material depending upon the service for which the valve is to be employed. The said seats may be formed on the plug or casing or both.

In the drawing there are upper and lower circumferential plug seat members 16 and 18 which extend around the plug 8 that engage and cooperate with circumferential seat members 20 and 22 of the casing or body. The latter may extend across the upper and lower sides only of the ports 4 or they may extend entirely around the plug bore.

Longitudinal seat members 24 are provided on the plug at either side of the ends of the passageway of the plug 8 which may be termed plug seats. Other longitudinal seat members 26 extend up and down for engaging and cooperating therewith in the body at the sides of the ports 40.

For convenience each set of seats 26 at opposite sides of the ports of the casing may be referred to as a pair of body seats while a set of seats 24 at opposite sides of the passageway of the plug may be referred to as a pair of plug seats.

In the closed position of the plug such as shown each pair of plug seats 24 are in engagement with a pair of body seats 26 while the upper and lower plug seats 16 and 18 are in engagement with the upper and lower body seats 20 and 22.

When the plug is moved axially for unseating, rotated from the open position shown to closed position and then moved axially for reseating in closed position, the seats 24 of a pair on the plug engage one seat 26 of each pair of body seats. Thus the seats of the plug are adapted and arranged for cooperating with the body seats in either open or closed position of the plug thereby obviating seats on opposite sides of the plug around the passageway thereof to cooperate with the body seats when in open position and other additional seats on opposite sides of the plug to cooperate with the body seats when the plug is in closed position.

Figure 3:
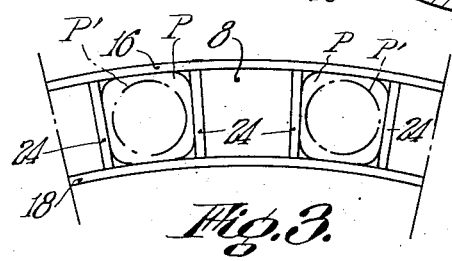
Fig. 3 is a small scale diagrammatic view of the surface of the plug of the valve in Fig. 1 in developed relation.

The body ports and plug passageways may take any form desired so long as they are circumscribed by the seat members. In the diagrammatic illustration of Fig. 3 the passageway P through the plug 8 is shown as being rectangular but it will be obvious that the same may be circular as indicated by dot-dash lines P' or of other shapes as may be desired.

From the foregoing it will be observed that seat members are arranged whereby the seats of the plug engage with those of the casing in either the open or closed position of the plug thereby eliminating plug seats for engaging those of the casing in one position of the plug and other plug seats engageable with the casing seats in another position while at the same time the novel seating arrangement facilitates manufacture and enhances efficiency in operation.

Having described the invention in the form at present preferred what it is desired to claim and secure by Letters Patent of the United States is:

The combination in a cone plug valve of, a body having inlet and outlet ports and an intersecting plug bore, a plug disposed in said bore having a passageway therethrough and adapted to reciprocate up and down in the body between seated and non-seated positions and to rotate in the body between open, closed, and intermediate positions, a raised seat member extending horizontally along both the upper and lower ends of the outside of said plug, a raised seat member extending horizontally along both the upper and lower ends of the inside of said body adapted to be engaged by said horizontal seat member on the plug when the latter is in any one of its seated positions, a set of unconnected raised seat members extending vertically on the outside of said plug, one being disposed adjacent each side of the opposite sides of said passageway, and a set of unconnected raised seat members extending vertically on the inside of said body, one being disposed adjacent each side of each port and arranged so that each one of the raised seat members on the plug engages a certain one of the raised seat members on the body when the plug is in open seated position and engages a certain other one when the plug is in closed seated position.

DAVID D. GOLDBERG.